Figure 1:
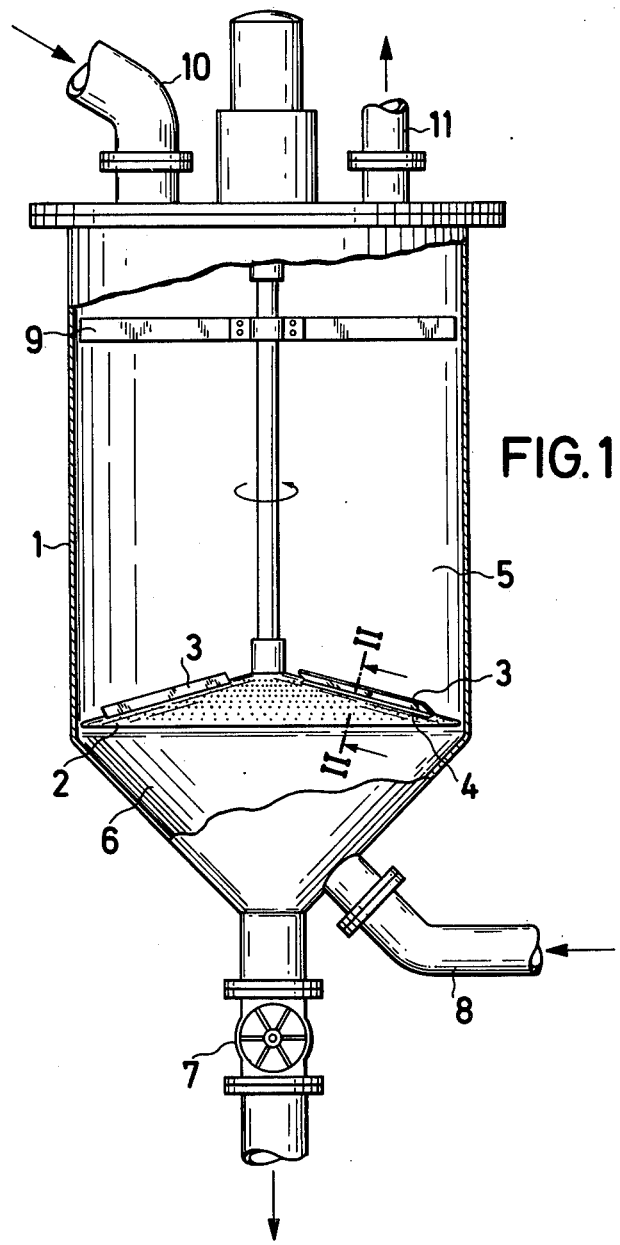

United States Patent [19]

Breitschaft et al.

[11] 4,120,849

[45] Oct. 17, 1978

[54] PROCESS FOR CRYSTALLIZING AND DRYING POLYETHYLENE TEREPHTHALATE AND APPARATUS TO CARRY OUT SAID PROCESS

[75] Inventors: Siegfried Breitschaft, Augsburg; Rolf Höltermann, Tafertingen, both of Fed. Rep. of Germany

[73] Assignee: Hoechst Aktiengesellschaft, Frankfurt am Main, Fed. Rep. of Germany

[21] Appl. No.: 751,014

[22] Filed: Dec. 16, 1976

[30] Foreign Application Priority Data

Dec. 24, 1975 [DE] Fed. Rep. of Germany ....... 2558730

[51] Int. Cl.² .............................................. C08G 63/74
[52] U.S. Cl. ................................................... 528/502
[58] Field of Search ......................... 260/75 T, 75 M

[56] References Cited

U.S. PATENT DOCUMENTS

| | | | |
|---|---|---|---|
| 3,014,011 | 12/1961 | Zoetbrood | 260/75 T |
| 3,305,532 | 2/1967 | Middleburg et al. | 260/75 T |
| 3,547,890 | 12/1970 | Yamada et al. | 260/75 T |
| 3,756,990 | 9/1973 | Jaeger et al. | 260/75 M |

*Primary Examiner*—Lucille M. Phynes
*Attorney, Agent, or Firm*—Connolly and Hutz

[57] ABSTRACT

Polyester granules are crystallized and dried by passing hot gasses of 120° to 190° C in upward direction through the stationary layer of loose polyester granules resting in a cylindrical container on a plane or conical perforated tray slowly rotating about its vertical axis. The hot gas is passed through the material in an amount such that no fluidization is brought about. Under the action of the hot gas the granules agglomerate and the agglomerate is alternately slightly lifted and lowered again by stripping edges on the perforated tray whereby the agglomerate portion resting on the tray is disintegrated and the crystallized granules are discharged through slots behind the stripping edges in the tray.

2 Claims, 2 Drawing Figures

PROCESS FOR CRYSTALLIZING AND DRYING POLYETHYLENE TEREPHTHALATE AND APPARATUS TO CARRY OUT SAID PROCESS

This invention relates to a process and an apparatus for crystallizing and drying polyethylene terephthalate.

Prior to being processes into fibers, sheets and other shaped structures polyethylene terephthalate, which is generally obtained in the form of amorphous granules, must be dried very carefully. Otherwise the sensitivity of the polyester to hydrolyze at elevated temperature, especially in the molten state, gives rise to degradation reactions whereby the mechanical properties are detrimentally affected.

In industry, polyethylene terephthalate is preferably dried by heating the granules and the emerging moisture is carried off by a gas current as rapidly as possible. In this process the drying temperatures are necessarily above the second order transition temperature of the polyester (about 80° C.) and therefore, the amorphous polyethylene terephthalate is transformed into the crystalline state. When, however, the amorphous material is heated above the second order transition temperature, it tends to become sticky and agglomerates are formed and, therefore, special measures are required to ensure unobjectionable drying and further processing without trouble.

Many proposals have been made to overcome the difficulties arising from the agglomeration of the polyester granules. According to the process of U.S. Pat. No. 3,014,011, prior to drying crystallization is brought about by the action of swelling agents, steam or hot water. This process has the drawback that the removal of the solvents used as swelling agent is rather probematical or, in the case of hot water or steam being used, the subsequent drying becomes more expensive because of the necessity to remove also the additionally absorbed water. According to German laid open Pat. No. 1,770,410 the polyester is crystalized while being in constant motion in an oscillating apparatus or in the crystallization zone of a reactor, which is not described in detail, whereby the molecular weight is increased. In another process the polyester is crystallized in the fluidized bed and agglomeration is avoided by adding 50% of crystallized material (German published application 1,454,834 and U.S. Pat. No. 3,305,532). In German Pat. No. 1,182,153 the flowability of the granules is maintained by a strong fluidization while in the process of U.S. Pat. No. 3,547,890 agglomeration is avoided by effecting crystallization and drying in a continuously operating apparatus in subsequent zones while stirring in the crystallization zone. The main disadvantage resides, however, in the fact that the granules are deformed by the mechanical strain in the plastic state. It has also been proposed to dry polyethylene terephthalate granules with the addition of antiblocking agents, optionally with simultaneous mechanical agitation. In German laid open Pat. No. 1,694,456 the chips are prevented from agglomerating by adding from 100 to 1,000 ppm of Mg stearate with slow temperature increase and according to German Offenlegungsschrift No. 2,124,203 agglomeration is prevented by adding $TiO_2$. A similar process is described in German laid open Pat. No. 2,352,426 in which drying is performed in a weakly agitated fluidized bed in the presence of Mg or Al stearate.

Hence, the known processes allow drying of polyethylene terephthalate granules but they are affected with disadvantages in that apparatuses of large dimensions and high amounts of energy are required or substances are added which are sometimes little suitable with regard to the intended use of the polyester and in many cases an additional deformation of the granules by the action of mechanical forces in the plastic state cannot be avoided.

It has now been found that amorphous polyethylene terephthalate granules can be crystallized and dried in one process step without the aforesaid disadvantages.

The present invention, therefore, provides a process for crystallizing and drying granules of amorphous polyethylene terephthalate by treating same with hot gases of from 120 to 190° C., which comprises passing, in the cylindrical drying zone of a cylindrical reactor, the hot gases in upward direction through a plane or conical perforated tray slowly rotating about its vertical axis and provided with stripping edges and discharge slots and through a loose layer of the polyester granules resting on said tray, the gases being passed through the layer of granules at a velocity such that no fluidization occurs, alternately lifting slightly and lowering the agglomerate of granules forming on the tray under the action of the hot gases by the stripping edges of the rotating perforated tray, thus disintegrating the agglomerate on the bearing surface and discharging the disintegrated polyester material through the discharge slots of the perforated tray.

It is surprising and could not have been foreseen that in the process of the invention, in contrast with general knowledge, it is not necessary but even disadvantageous to keep in motion the polyester granules heated to a temperature above the second order transition temperature in order to obtain a freely flowing crystalline product and that the best results are obtained when a loose layer of granules, as formed by freely pouring the material into a container, is subjected to the action of the hot gases and allowed to agglomerate without interference. It is also surprising that inspite of considerable layer thicknesses which may be as high as 1 to 4 times the reactor diameter, the formed agglomerate has a minor stability only and, therefore, the product can be disintegrated in the crystallized state and readily discharge.

The measures in accordance with the invention ensure that there is a few number of points of contact between the individual granules than in an "ideal" packing produced by vibration or agitation and that the strength of agglomeration is only determined by the pressure exerted by the own weight. Due to the fact that in the zone of crystallization no additional local compression, which would necessarily result from stirring, occurrs and that the heating and drying gas is passed through the material at a velocity which is not sufficient for fluidization of the granules, the product is not subjected to any mechanical strain before crystallization is terminated, i.e., the process step in which the polyester granules lose their stickiness. Hence, the granules are not deformed by any strain in the plastic state.

According to the invention the formed agglomerate is not disintegrated until the granules have lost their tendency to agglomerate, i.e., they have been transformed into the crystallized state. For disintegration the stripping edges mounted on the perforated tray rotating about its vertical axis reduce the agglomerate resting on said tray at its lower side to particulate matter and the granules which are again freely flowing are discharged through the slots in the tray.

In addition to the specified advantages, the process of the invention requires relatively little energy and expenditure pertaining to apparatus, the particles are not abraded and very short residence times are sufficient as only a plug flow can form due to the agglomeration.

Figure 2:
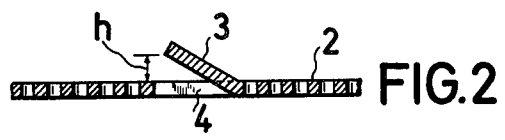

It is further object of the invention to provide an apparatus suitable to dry and to crystallize polyethylene terephthalate, which apparatus will described in detail by way of example with reference to the accompanying drawing of which FIG. 1 is a longitudinal view partly in section of the apparatus and FIG. 2 represents a sectional view along line II—II of FIG. 1.

Referring now to FIG. 1, the apparatus comprises in a container (5) a cylindrical drying zone (1) which is closed at its lower end by a plane or conical perforated tray (2) with stripping edges (3) and discharge slots (4). The perforated tray is fixed on a concentric vertical axle around which it slowly rotates during operation. The diameter of the tray is only a little smaller than the diameter of the drying zone, that is to say the tray nearly scrapes along the wall of the drying zone. The perforated tray is driven by an axle which protrudes out of the apparatus at the upper or optionally the lower end and which, according to these possible constructional features, can be supported below the perforated tray or above the layer of material. To achieve the desired effect, i.e., alternately to lift slightly and to lower the product layer and thereby to disintegrate the lower portion of the agglomerate of granules so that the granules can be discharged, different modes of construction of the perforated tray are possible. According to a very simple embodiment the tray is provided with one or several radial cuts and each time one of the cutted edges is bent in the direction of the product layer to form the stripping edges as illustrated in FIG. 2. In the case of possible discharge troubles, the direction of rotation of the tray can be reversed for a short period of time. In general, the stipping means have a straight edge although edges with teeth are also possible.

Below the perforated tray a chamber (6) is provided for in which the dried product accumulates and through which the hot gas is fed to the perforated tray. The chamber is optionally dimensioned in such a manner that the accumulated granules can be after-dried or drying is finished by passing the drying gas at first through the material. The crystallized and dried polyethylene terephthalate is discharged through discharge means, in the present case a rotary valve (7). The used hot gas (8), escapes through pipe (11) while the polyester material is introduced through inlet (10).

The drying gases have a temperature of from 120° to 109° C., preferably 140° to 170° C. They are fed to the drying apparatus in such an amount that no fluidization of the material takes place. Air proved to be especially suitable.

The process of the invention is preferably operated in continuous manner. The polyester layer in the drying zone above the perforated tray may have a height which is equal to 1 to 4 times the reactor diameter. When the process is carried out continuously a distributor (9), which rotates together with the perforated tray, should level the upper surface of the bulk material.

The process of the invention can be used to crystallize and dry polyethylene terephthalate granules having a reduced specific viscosity of from about 0.4 to about 1.0 dl/g (measured in a 3:2 by weight mixture of phenol-tetrachloroethane) which is usual for further processing. The granules can be free from pigments or contain pigments. It is also possible to treat, according to the invention, polyethylene terephthalate modified by other acids or glycols provided that such a modification does not affect essentially the crystallization properties of the product.

The process is suitable for all types of granules usual with polyethylene terephthalate, such as obtained from ribbons or ropes or by underwater granulation.

The following example illustrates the invention.

EXAMPLE

A drier as shown in FIG. 1 having a cylindrical drying zone with a diameter of 60 cm and a height of 150 cm, corresponding to a capacity of about 400 liters, and a discharge cone of a length of 40 cm is provided at the transition between the drying zone and the discharge cone with a perforated tray which can be slowly rotated around its vertical axle. The drier is charged via a suction conveyer through inlet (10) with about 250 kg of amorphous polyethylene terephthalate (bulk weight about 0.75 g per cm$^3$) while the tray is at a standstill. The layer above the tray has a height of about 125 cm. The tray through which the gas streams into the drying zone has a very flat conical shape, at the apex it is connected to the axle of rotation. The tray consists of a skeleton of stainless steel bearing a perforated sheet with an orifice diameter of 2 mm. The preforated sheet is provided with two radial discharge slots having a length of 25 cm and a width of 2 cm and the front edge of each slot in the sense of rotation carries a likewise radial stripping edge having a height of 1.5 cm and a width of 25 cm (cf. the letter $h$ in FIG. 2).

Without rotation of the tray air of 170° C., which has not been predried particularly, is forced by a blower in upward direction for about 1 hour through the perforated tray and the loose material. The air current of 200 Nm$^3$/hr ensures that a fluidized bed is not formed. The polyester material crystallizes during the indicated period of time which can be perceived by the opaque appearance up to the material inlet. The tray is then allowed to rotate slowly (1.5 revolutions per minute), whereby the cyrstallized and dried product is gradually discharged into the cone, from where it is removed through the rotary valve. During this period, the dried material uniformly sinks over the entire sectional area. To keep constant the height of the material layer in the drying zone undried granules from a container are introduced and the loose material is levelled by the distributor fixed on the axle of the tray.

From the drier about 100 kg/hr of dried and crystallized polyester granules are discharged.

What is claimed is:

1. A process for crystallizing and drying granules of amorphous polyethylene terephthalate by treating same with hot gases at a temperature of from 120° to 190° C., the hot gases passing through a cylindrical layer of loose polyester granules, which comprises crystallizing and drying the polyethylene terephthalate in a single process step with avoidance of fluidization and movement of said layer wherein under the action of the hot gases the cylindrical layer of loose polyester granules agglomerates to a cylindrical block, destroying said cylindrical block from the bottom thereof by scratching it off in layers by means of a perforated tray rotating about its vertical axis and provided with stripping edges and discharge slots, and discharging the disintegrated polyester material through the discharge slots of the perforated tray.

2. The process of claim 1, wherein the crystallization and drying is performed continuously and the layer of the loose polyester material has a height which is equal to 1 to 4 times the reactor diameter.

* * * * *